(No Model.)  2 Sheets—Sheet 1.
D. J. TAPLEY.
PHOTOGRAPHIC CAMERA.
No. 457,857.  Patented Aug. 18, 1891.
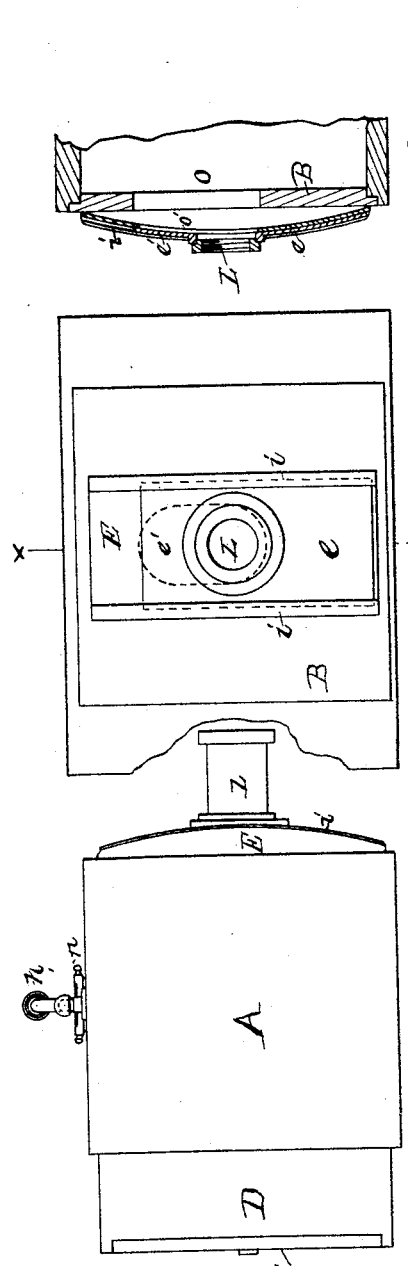
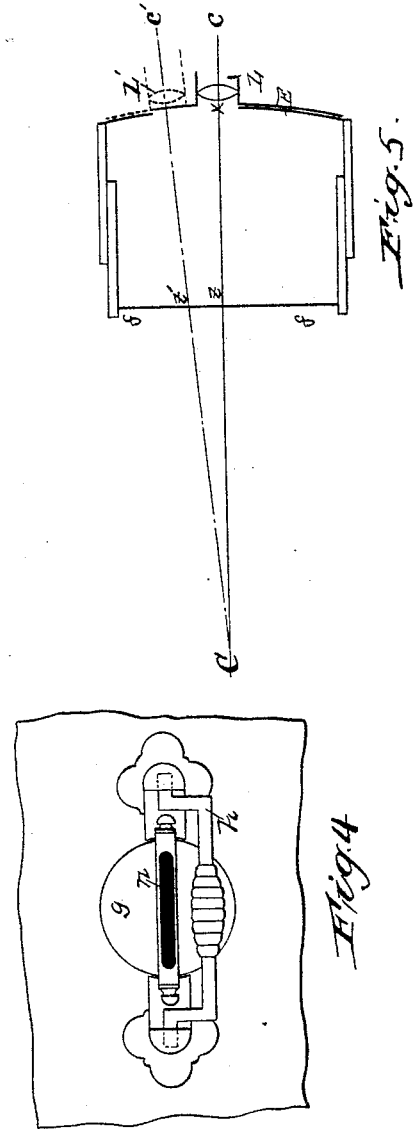
Attest
Geo. W. Benjamin
Chas. S. Scanlan.
Inventor:
Daniel J. Tapley
By W. F. Hapgood
Atty (No Model.) 2 Sheets—Sheet 2.
D. J. TAPLEY.
PHOTOGRAPHIC CAMERA.
No. 457,857. Patented Aug. 18, 1891.
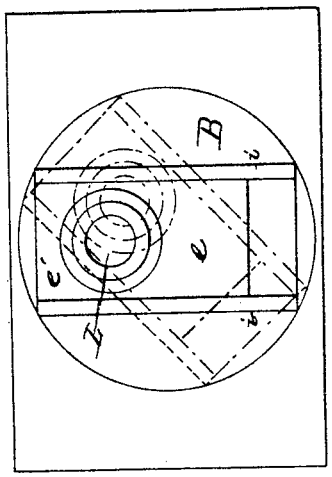
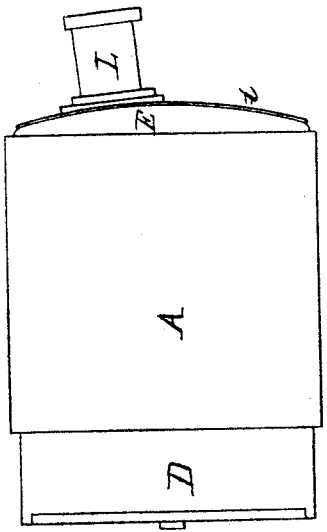
Attest:
C. W. Benjamin.
Chas. S. Scanlan.
Inventor:
Daniel J. Tapley.
By W. F. Hapgood
Atty

UNITED STATES PATENT OFFICE.

DANIEL J. TAPLEY, OF NEWTOWN, NEW YORK.

PHOTOGRAPHIC CAMERA.

SPECIFICATION forming part of Letters Patent No. 457,857, dated August 18, 1891.

Application filed May 10, 1890. Serial No. 351,226. (No model.)

*To all whom it may concern:*

Be it known that I, DANIEL J. TAPLEY, a citizen of the United States, residing at Newtown, in the county of Queens and State of New York, have invented certain new and useful Improvements in Photographic Cameras, of which the following is a specification.

When we wish to get a picture of a lofty object with the present form of camera, we are obliged to have recourse to a complicated series of adjustments provided for the purpose, consisting of rising and swinging front and swinging back, and whenever one of these adjustments is moved it necessitates the correlative shifting of one or all of the other parts. For example, placing the camera on the tripod, it is first tipped up by moving the tripod-legs at what is supposed to be the required angle. Then the back of the camera is made level sidewise. Next the back is swung to a vertical position, and afterward the lens is slid upward as much as is judged necessary, and finally the camera is focused. As this process is in the first instance entirely tentative, it is usually found on focusing that the elevation or placing of the image is not correct and that some portion of the adjustment must be corrected. This correction of one part will necessitate the adjustment of one or more of the other parts, and then the object must be refocused. It is evident that this series of adjustments may have to be repeated several times before the required position is obtained.

The object of my invention is to do away with these various swings and accomplish the adjustment by the movement of a single part; and I accomplish this object by means of the mechanism shown in the accompanying drawings, wherein—

Figure 1 is a side elevation of a camera with my improved attachment. Fig. 2 is a front elevation of the camera fitted with a square front. Fig. 3 is a section through the line $x$ $x$, Fig. 2. Fig. 4 is a plan of a portion of the top of the camera, showing arrangement of handle and level; and Fig. 5 is a longitudinal sectional diagram of the camera, showing lens in different positions. Fig. 6 is a side view of a camera with lens in elevated position, and Fig. 7 is a camera-front with circular front board.

The camera here shown is of the simple telescopic variety, A, Fig. 1, being the body; D, focusing-draw, and F the focusing-screen.

E is a light-tight slide attached to the front board B, having the form of the sector of a circle in elevation and provided with grooves $i$ $i$, Figs. 2 and 3, arranged to receive the plate $e$, which carries the lens L.

O is an opening in the front board to allow the passage of the light-rays from the lens, and $o'$ is a similar opening in the face of the frame E.

The front board B may be either square or round, with rabbeted edges fitting a corresponding rabbet on front of body A, so that it may be reversed or revolved.

In Fig. 4, $h$ is a handle for carrying the instrument, the plate of which forms the bed of a turn-table $g$, which carries a spirit-level $n$.

In Fig. 5, $f$ $f$ is the focusing-screen. C $c$ shows the direction taken by the axial rays in passing through the lens when in position L, C' $c'$ the direction of the same rays when the lens is elevated in position L', (shown in dotted lines,) and $t$ and $t'$ the points where these rays, respectively, cut the focusing-screen, showing very clearly how the combined effect of the elevation of range and the "rise" of the horizontal plane of the lens is produced by the one simple motion. C is the center of the arc of the curved slide E.

In practice I prefer to make the radius $C^x$ about twice the focal length of the average lens to be used; but a good deal of latitude is possible.

The operation of my improved camera is as follows: The legs of the tripod are spread out, so that the camera stands solidly against the wind or other force which may be exerted to overturn it, and the camera, being attached to the tripod-top, is at once leveled in both directions by means of the turn-table level $n$. The lens is then slid upward in the curved slide until the range is sufficiently elevated to take in the desired height of view—say from position L to position L', Fig. 5. The effect of this movement of the lens is not only an elevation of range, but a rising of the image on the plate, bringing its center from the point $t$ to the point $t'$, thus combining the effect of both "elevation" and rise and avoiding a hurtful extreme of either.

The image is then focused, and if enough altitude is not included the lens is simply slid up farther without interfering with the level of the instrument or moving any other part. If the range is to be depressed, which infrequently occurs, the square front board is simply reversed in the square rabbeted opening of the camera-front, and an equally simple reversal of the front board changes the direction of the lens-slide for a "vertical" view. The movement of the lens on a curved path takes the place of the double adjustment usually effected by means of the rising front and swinging motions of the back of the ordinary camera. Moreover, as this motion admits of a greater range of adjustment than is possible with the sliding and swinging movements of the ordinary front, we are not compelled to tip the entire instrument up at an angle to bring the lens in range with a lofty object, thereby doing away with the necessity for the swingback. Another advantage of my improved method of construction is that (as flexibility is not necessary) I can make a camera without using a bellows, its place being taken by the telescopic boxes, as shown in the drawings, which are cheap, effective, impervious to light, and in many other ways convenient and desirable.

Another and perhaps preferable arrangement is a circular instead of a square rabbeted front aperture, as shown in Fig. 7. This forms an easy method of reversing the front board, and also gives not only the effect of a vertical but of a side swing, and when turned diagonally, as shown in the dotted lines, gives the effect of any combination of vertical and side swing.

In order to avoid making the slide so long as to project above the top of the camera when placed at its upper position, I limit the length of the opening $o'$ in the face of E, making it a little wider than the lens-tube and about two diameters of the tube long, with its lower extremity somewhat below the lower part of the lens when in its central position. The opening O in the front board B is oblong in shape, corresponding to the opening $o'$ in the frame E, but somewhat larger. The upper part of $e'$ is made long enough to cover with proper lap the upper portion of this opening, while the lower part of $e$ extends nearly to the lower edge of the front board. By this arrangement the opening $o'$ is kept covered light-tight in whatever position the lens and slide E may be placed.

In the drawings I have shown my improved construction as applied to the simple telescope form of camera-body; but it may equally well be used upon any of the present forms of cameras.

What I claim, and desire to secure by Letters Patent, is—

1. In a photographic camera, the combination of a curved slideway or track mounted on the front of the camera, the radius of the curvature of said slideway coinciding with the axis of the lens, with a lens movable in said slideway, substantially as and for the purpose set forth.

2. In a photographic camera, the reversible or rotating front board B, carrying the curved slide E, the lens-plate $e$, movable in said slide, and the lens L, in combination with a camera-body, substantially as described.

3. In a photographic camera, the combination of the reversible front board B, provided with elongated opening O for the passage of light from the lens, with the upper curved slide E, mounted on said front board, the curved lens-plate $e$, movable in said slide, and the lens L, substantially as described.

DANIEL J. TAPLEY.

Witnesses:
ISAAC B. RIPINSKY,
CHAS. S. SCANLAN.